United States Patent
Ames et al.

(10) Patent No.: US 9,455,974 B1
(45) Date of Patent: Sep. 27, 2016

(54) METHOD AND SYSTEM FOR DETERMINING VALUE OF AN ACCOUNT

(71) Applicant: Google Inc., Mountain View, CA (US)

(72) Inventors: Phillip Ames, Mountain View, CA (US); Robert Wilson Reeder, Mountain View, CA (US)

(73) Assignee: Google Inc., Mountain View, CA (US)

( * ) Notice: Subject to any disclaimer, the term of this patent is extended or adjusted under 35 U.S.C. 154(b) by 64 days.

(21) Appl. No.: 14/197,680

(22) Filed: Mar. 5, 2014

(51) Int. Cl.
*G06F 7/04* (2006.01)
*H04L 29/06* (2006.01)
*G06F 21/00* (2013.01)

(52) U.S. Cl.
CPC ............... *H04L 63/08* (2013.01); *G06F 21/00* (2013.01); *H04L 63/10* (2013.01)

(58) Field of Classification Search
CPC ......... H04L 63/08; H04L 63/10; H04L 9/32; G06F 21/31
See application file for complete search history.

(56) References Cited

U.S. PATENT DOCUMENTS

| | | | |
|---|---|---|---|
| 8,302,152 B1 | 10/2012 | Hewinson | |
| 9,124,650 B2 * | 9/2015 | Maharajh | |
| 2005/0278776 A1 * | 12/2005 | Kitagawa et al. | 726/3 |
| 2008/0010674 A1 * | 1/2008 | Lee | 726/7 |
| 2009/0187962 A1 * | 7/2009 | Brenneman et al. | 726/1 |
| 2010/0011436 A1 * | 1/2010 | Rolls et al. | 726/15 |
| 2010/0100972 A1 * | 4/2010 | Lemieux et al. | 726/34 |
| 2010/0106560 A1 * | 4/2010 | Li et al. | 705/10 |
| 2010/0175116 A1 | 7/2010 | Gum | |
| 2010/0257577 A1 * | 10/2010 | Grandison et al. | 726/1 |
| 2010/0281521 A1 * | 11/2010 | Sakakihara et al. | 726/3 |
| 2011/0016056 A1 * | 1/2011 | Hargroder | 705/325 |
| 2011/0040666 A1 * | 2/2011 | Crabtree | G06Q 30/0283 705/37 |
| 2011/0179477 A1 * | 7/2011 | Starnes et al. | 726/9 |
| 2011/0185258 A1 * | 7/2011 | Grube | H04L 67/1097 714/763 |
| 2012/0046012 A1 * | 2/2012 | Forutanpour et al. | 455/411 |
| 2012/0144468 A1 * | 6/2012 | Pratt et al. | 726/7 |
| 2012/0159590 A1 * | 6/2012 | Novack et al. | 726/7 |
| 2012/0289147 A1 * | 11/2012 | Raleigh | H04L 67/2847 455/3.06 |
| 2013/0067582 A1 * | 3/2013 | Donovan et al. | 726/25 |
| 2013/0104187 A1 | 4/2013 | Weidner | |
| 2013/0238777 A1 * | 9/2013 | Raleigh | H04L 67/1097 709/223 |
| 2014/0130127 A1 * | 5/2014 | Toole et al. | 726/3 |
| 2014/0143327 A1 * | 5/2014 | Rajaram et al. | 709/204 |
| 2014/0196110 A1 * | 7/2014 | Rubinstein et al. | 726/3 |
| 2014/0325617 A1 * | 10/2014 | Jakobsson | 726/5 |
| 2014/0331278 A1 * | 11/2014 | Tkachev | 726/1 |
| 2015/0006904 A1 * | 1/2015 | Kimoto et al. | 713/186 |

OTHER PUBLICATIONS

"When the Password Doesn't Work, Secondary Authentication for Websites", copublished by the IEEE Computer and Reliability Societies, Mar./Apr. 2011.

Schechter et al., "1+1=You, Measuring the comprehensibility of metaphors for configuring backup authentication", Symposium on Usable Privacy and Security (SOUPS) Jul. 15-17, 2009.

* cited by examiner

*Primary Examiner* — Techane Gergiso
(74) *Attorney, Agent, or Firm* — Fox Rothschild LLP

(57) ABSTRACT

A system determines a value of an online account, and uses that value to identify a security-related mechanism for the account. The system determines the account value by taking as input various quantified characteristics of the account. The system weights each characteristic according to various criteria. The system may then use the weighted signals as inputs of an algorithm to calculate the account value for the account, and it may determine a security-related action that corresponds to the account value.

16 Claims, 3 Drawing Sheets

METHOD AND SYSTEM FOR DETERMINING VALUE OF AN ACCOUNT

BACKGROUND

Many authentication methods and other security mechanisms are available to protect online accounts against unauthorized access. In general, all such methods require a compromise between ease of access to the account by the owner and strength of security against access by an attacker. For example, a simple password may permit a user to quickly and easily access an account. In contrast, a security mechanism that requires the combination of a password plus a one-time personal identification code is not as easy for the account's user, but it is considerably harder for an attacker to breach than the simple password option.

Determining an appropriate authentication method to use for a particular account can be challenging. Using methods that are too onerous may lock legitimate users out of their accounts, while using methods that are too lax may allow attackers in.

Accordingly, the inventors have determined that there is a need to identify methods that more effectively balance the trade-off between effective security and ease of use.

SUMMARY

In various embodiments, a system including one or more processors and one or more data storage facilities implements a method of assigning a value to an account that is associated with data maintained at the data storage facilities. The data is made of various data elements, and the system automatically identifies a set of signals in the data elements. For each of the signals, the system determines a signal value based on metadata with the data element or by any suitable process. The system assigns weights to at least a subset of the signal values to yield a set of weighted signal values. The system then uses the set of weighted signal values to assign an account value to the account. Based on the account value, the system may select a security mechanism or a storage-related action that corresponds to the account value, and it may present the security mechanism or storage related action to the user.

In some embodiments, when assigning the weights to at least a subset of the signal values to yield the set of weighted signal values, the system may use the signal values for a first one or more of the signals to determine a weighted signal value for a second one of the signals. It may then determine the weighted signal value for the second signal as a product of the determined weight and the signal value of the second signal.

Optionally, when using the set of weighted signal values to assign the account value to the account, at least one of the signals may be a binary signal that can have only a first value or a second value (such that the first value signifies a high value account). If so, then the system may determine that the binary signal has a signal value that equals the first value, and if so it may assign a known high quantitative value as the account value.

In some embodiments, the system may present indicia of the assigned account value to the user, receive user feedback relating to the assigned account value, use the feedback to adjust one or more of the weights, use the adjusted one or more weights to update the set of weighted signal values, and use the updated set of weighted signal values to update the account value.

Optionally, a first group of the signals may include any of the following: an age of the account, a frequency of use of the account by the user, or an amount of data associated with the account. If so, then when assigning the weights to the signal values for each signal in the first group the system may: determine whether the signal value of the signal exceeds a threshold; convert the signal value to a quantitative value based on whether or not it exceeds the threshold; and multiply the quantitative value for the signal by a weight that corresponds to the signal to yield the weighted signal value for the signal. Alternatively, a first group of the signals may include any of the following: an ability of the account to access a different account; or an ability of the account to access a financial instrument. If so, then when using the set of weighted signal values to assign an account value to the account, if at least one of the signals in the first group is present, the system may automatically assign a known high value as the account value.

As another alternative, at least one of the signals may include a measured value of contact information for the user. If so, then the system may determine the measured value of contact information based on at least one of the following: a number of entities who are contacts that the user has in a contacts database; or a number of entities who are contacts of entities who are also contacts of the user. As yet another alternative, at least one of the signals may include a measured value of reputation for the user. If so, then the system may determine the measured value of reputation based on at least one of the following: a measurement of external sources that point to published information relating to the account; a measurement of a level of interactions that involve the user's account, where the interactions are those that are between the user and contacts of the user; or a measurement of a level of external communication directed from the account.

DETAILED DESCRIPTION

Figure 1:
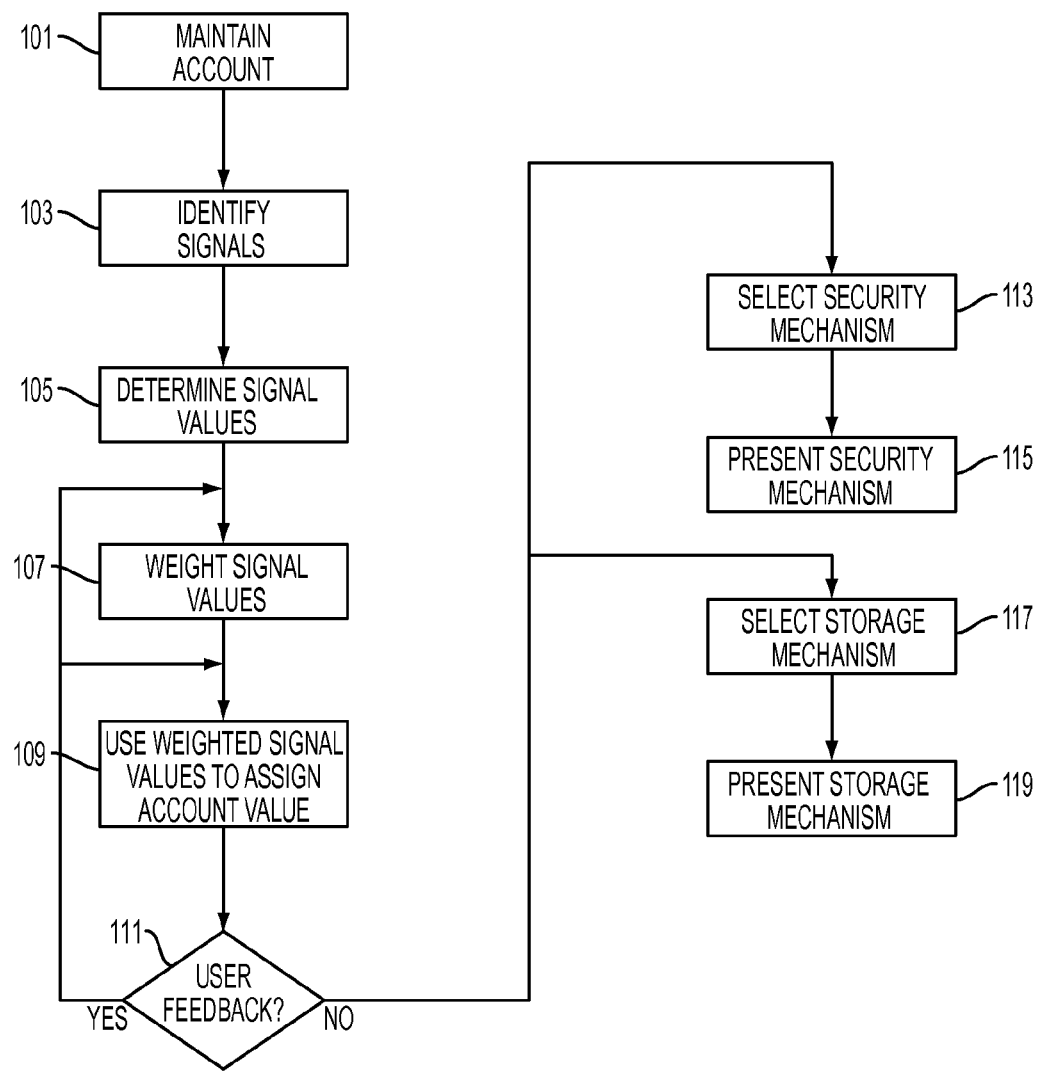
FIG. 1 is a flowchart illustrating a process of determining a value of an account.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

In this document, a "computing device" refers to a device that includes a processor and non-transitory, computer-readable memory. The memory may contain programming instructions that, when executed by the processor, cause the computing device to perform one or more operations according to the programming instructions. As used in this description, a computing device may be a single device, or any number of devices having one or more processors that communicate with each other and share data and/or instructions.

As used in this document, an "account" means an online set of data that is stored in a data storage facility and associated with a user. Examples of accounts include those for e-mail services, photo storage services, document storage or backup services, social media services, audio and/or video media sharing services, and other online services. To access the data of an account, the user must perform an action that is required by a security mechanism that uses the action to authenticate the user to a device, system, application or data set. Examples of security mechanisms include prompts that require a user to present a token, enter or speak a passcode, provide a biometric identifier, perform a known sequence of steps, or take other actions. The system can then compare the user's response to a set of known responses identify whether the user is authorized to access the device, system, application or data set.

Online accounts are valuable, both to their owners and to online attackers who may attempt to hijack the accounts. Email accounts, photo collection accounts, online data backup accounts, online financial accounts and other accounts all have intrinsic value because of the often-personal data that may be stored with the account, the ability of the account to communicate with or obtain information from external resources, or other features. However, not all accounts may have the same value to a user or potential hijacker.

The inventors have determined that a value of an account may depend on factors such as the type of data stored in or associated with the account, the amount of data stored in or associated with the account, capabilities of the account, or measured usage characteristics of the account. For example, a free webmail account is worth very little immediately after it is acquired. However, the account will gain value as it is used. Over time and through usage, a webmail account may gain contacts, communications history, other data and reputation. One account also may become a gateway to other valuable accounts, such as if it is used as an account recovery mechanism for those other accounts. The value of an account accrues to the account's owner, but an attacker also may consider the account to have value if the attacker is able to compromise the account.

This document describes a method and system for determining a value of an account, as well as for using that value to take a security-related action by determining an appropriate security mechanism to protect the account. As an alternative, the system may use the value to take a storage related action that helps to back up and/or otherwise protect data associated with the account.

FIG. 1 is a flowchart describing various steps that a system may implement to determine a value and a security mechanism for an account. The system will maintain an account at one or more data storage facilities (step 101). A data storage facility is a set of one or more non-transitory computer-readable media on which data associated with the account is stored. The account may be stored on a single storage facility or distributed across multiple facilities. In addition, some data elements may be separated from other data elements based on a type of data element. For example, actual user data (such as messages, photos, or document files) may be stored in one facility, metadata that is descriptive of the user data (such as file type, date created, or intended use) may be stored in another facility, user profile data may be stored in another location, and measured usage parameters (such as a frequency of access and/or updating) may be stored in another facility.

The method determines the account value by automatically identifying and quantifying various characteristics of the account, which may be referred to as "signals" (step 103). Each signal is assigned either a binary value or a score. The system determines a value of each signal (step 105) and weights each signal according to various criteria (step 107). Weights are numerical factors by which each signal value may be multiplied or otherwise adjusted. The system may then use the weighted signals as inputs of an algorithm to calculate a numeric account value for the account (step 109).

Signals may include, for example: (i) an age of the account; (ii) a frequency of use of the account (such as logins per time period, actions taken by the user per time period, a number of messages sent from the account or files uploaded to the account in a time period, etc.); (iii) contact information associated with the account (such as pointers to other accounts associated with friends or contacts of the account owner); (iv) reputation of the account (e.g., that of the owner, or of contacts in the case of social networking providers with contact lists for friends); (v) an amount of data stored or associated with the account (e.g., e-mail, file uploads, pictures, etc.); (vi) an ability of the account to access other accounts (e.g., password reset communications from other service providers may be sent to this account); (vii) an ability of the account to access or use financial instruments (e.g., an ability to make payments, an ability to transfer money, etc.); or (viii) a type of data in the account (e.g., personal financial records, personal health records, corporate sales records, etc.).

The system may automatically calculate the value of each signal (step 105) by analyzing characteristics of the signals as found in the account's data elements as stored in a data storage facility. The characteristics may be found in account aspects such as metadata for the account, measured data relating to account usage or authorization levels, or an assessment of actual data in the account. For example, the value of a signal representing an amount of data may be a measured value of the data, while the value of a type of data may be determined by assigning certain types of data (such as personal financial or health data) higher values than other types of data (such a person's music library or data that a user has shared on a public website).

Figure 2:
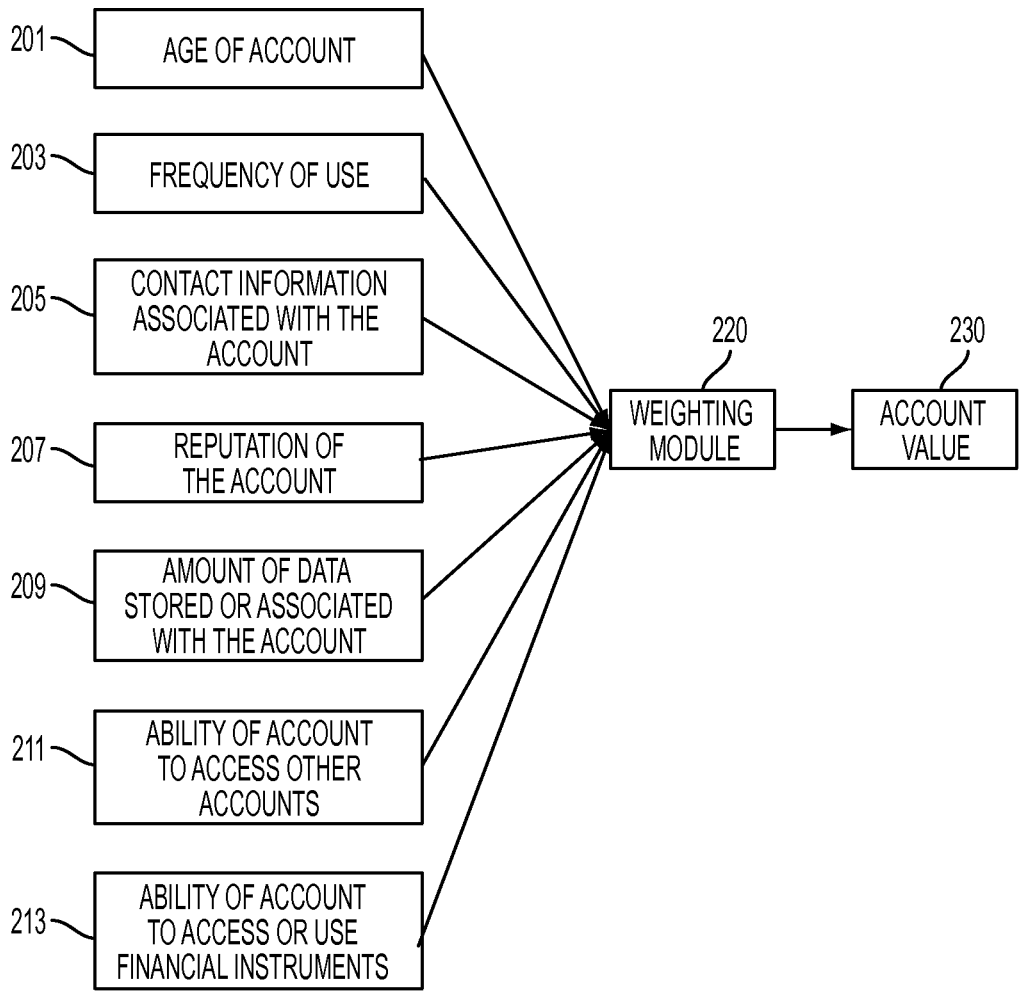
FIG. 2 is a diagram illustrating an example of signals that may be received by a weighting module and scoring module of an account valuation system.

FIG. 2 illustrates examples of a process by which a weighting module 220 of the system may assign or receive values for various types of signals. As shown, the signals may include any or all of the following: an age of the account 201; a frequency of use of the account 203; contact information associated with the account 205; reputation of the account 207; an amount of data stored or associated with the account 209; an ability of the account to access other accounts 211; an ability of the account to access or use financial instruments 213; or other signals. After the weighting module assigns weights to any or all of the signals, an account value scoring module 230 may then use the weighted signal values to determine a value to assign to the account.

Returning to FIG. 1, in some embodiments the algorithm used in the weighting process (step 107) may be dynamic, in that the system may use the value of one signal (or the values of a first set of signals) to determine how much (or how little) to weight another signal. As an example, a first signal relating to an age of the account may be used to determine how much weight to apply to a signal based on frequency of use such that the frequency signal is given greater weight (and this value) on an older account. Thus, the weight applied to the second signal should be increased as the value of the first signal increases. Some characteristics may be binary, meaning that if the characteristic is present the system will automatically consider the account to be a high value account. Other characteristics may be represented by quantitative values. In addition, the system may present the user with various queries, and it may use the responses to determine how to weight various signals.

Optionally, the system may determine a preliminary account value and present the preliminary account value (or something representing the value) to the account's user to solicit feedback (step 111). Examples of indicia that may represent the account value include a proxy indicator, a word or phrase representing the value, or other indicia that may be more user-friendly than a raw number. The system may then set or adjust the final value or any weighting factor based on the user's feedback.

The system may use the value to determine a security-related action that the user or the account's service provider may take (step 113), such as: (i) recommending that the user enable a stronger password or authentication sequence (such as multi-factor authentication) for the account; (ii) recommending that the user take other security precautions for the account, such as to enable account recovery mechanisms or per-transaction authentication; (iii) adjusting thresholds for detecting fraudulent attempts to access the account; (iv) triggering alerts for manual review of an account login; or (v) adjusting thresholds for requiring per-transaction authentication. It may then present the security mechanism to a user (step 115), such as by presenting it to the account's user for feedback, presenting it to an account custodian or service provider for implementation, or to the account system itself for implementation.

In addition or alternatively, the system may use the value to determine a storage-related action that the user or the account's service provider may take (step 117), such as: (i) recommending that the user increase an available storage capacity for the account; (ii) recommending that the user add an automatic data backup process to the account; or (iii) automatically taking either of the actions listed above. It may then present the storage-related action to a user (step 119), such as by presenting it to the account's user for feedback, presenting it to an account custodian or service provider for implementation, or to the account system itself for implementation.

Optionally, the value of an account may increase or decrease over time. The system may periodically determine an updated value, or it may do so upon a user request, or it may do so automatically based on certain criteria being satisfied.

Figure 3:
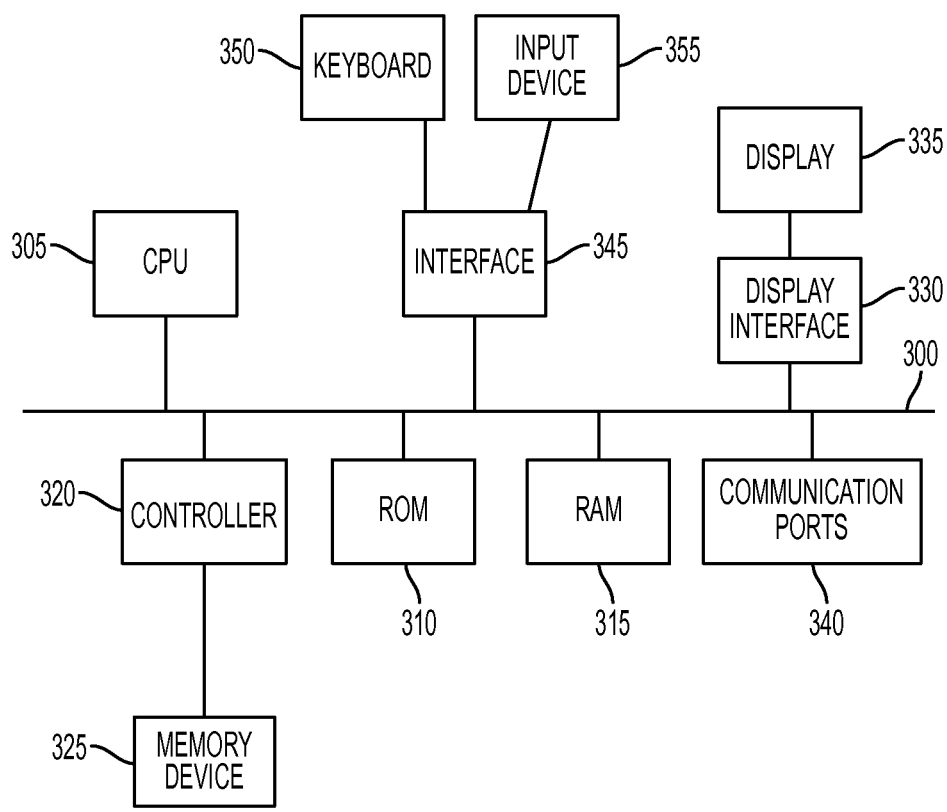
FIG. 3 is a block diagram showing elements of computing systems that may be used to implement various embodiments described in this document.

FIG. 3 depicts an example of internal hardware that may be used to contain or implement the various computer processes and systems as discussed above. An electrical bus 300 serves as an information highway interconnecting the other illustrated components of the hardware. CPU 305 is a central processing unit of the system, performing calculations and logic operations required to execute a program. CPU 305, alone or in conjunction with one or more of the other elements disclosed in FIG. 3, is a processing device, computing device or processor as such terms are used within this disclosure. When this disclosure or any claim uses the term "processor," unless specifically stated otherwise it may include a single processor, or multiple processors that distributed within a system or among multiple systems in a way such a together they perform all steps of a defined method. Read only memory (ROM) 310 and random access memory (RAM) 315 constitute examples of memory devices.

A controller 320 interfaces with one or more optional memory devices 325 that service as data storage facilities to the system bus 300. These memory devices 325 may include, for example, an external DVD drive or CD ROM drive, a hard drive, flash memory, a USB drive or another type of device that serves as a data storage facility. As indicated previously, these various drives and controllers are optional devices. Additionally, the memory devices 325 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 310 and/or the RAM 315. Optionally, the program instructions may be stored on a tangible computer readable medium such as a compact disk, a digital disk, flash memory, a memory card, a USB drive, an optical disc storage medium, a distributed computer storage platform such as a cloud-based architecture, and/or other recording medium.

A display interface 330 may permit information from the bus 300 to be displayed on the display 335 in audio, visual, graphic or alphanumeric format. Communication with external devices may occur using various communication ports 340. A communication port 340 may be attached to a communications network, such as the Internet, a local area network or a cellular telephone data network.

The hardware may also include an interface 345 which allows for receipt of data from input devices such as a keyboard 350 or other input device 355 such as a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A system for protecting stored account data from unauthorized access by determining a security-related action to implement in an account, comprising:
   one or more processors,
   a plurality of data storage facilities that maintain data elements corresponding to an account for a user, wherein the data elements are distributed across two or more data storage facilities and comprise two or more of the following data types: actual user data maintained at a first data storage facility, metadata descriptive of the actual user data maintained at a second data storage facility, user profile data maintained at a third data storage facility, and measured usage parameters maintained at a fourth data storage facility; and
   one or more non-transitory, computer-readable storage media containing programming instructions that, when executed by the one or more processors cause the processors to:
      automatically identify a plurality of signals in the data elements, wherein each of the plurality of signals comprises one or more characteristics of the account, selected from: an age of the account, a frequency of use of the account, contact information associated with the account, a reputation of the account, an amount of data stored or associated with the account, an ability of the account to access other accounts, an ability of the account to access or use financial instruments, or a type of data in the account, for each of the signals, determine a signal value, assign a plurality of weights to at least a subset of the signal values to yield a set of weighted signal values, use the set of weighted signal values to assign an account value to the account, use the account value to select a security-related action that corresponds to the account value, wherein the security-related action comprises one or more of the following:

enabling a stronger password or authentication sequence for the account, enabling one or more security precautions relating to account recovery mechanisms, enabling per-transaction authentication for the account, adjusting thresholds for detecting fraudulent attempts to access the account, triggering alerts for manual review of an account login, or adjusting thresholds for requiring per-transaction authentication, and cause an account system that comprises the plurality of data storage facilities to automatically implement the selected security-related action.

2. The system of claim 1, wherein the instructions to assign the plurality of weights to at least a subset of the signal values to yield the set of weighted signal values comprise instructions to:

use the signal values for a first one or more of the signals to determine a weighted signal value for a second one of the signals; and determine the weighted signal value for the second signal as a product of the determined weight and the signal value of the second signal.

3. The system of claim 1, wherein the instructions to use the set of weighted signal values to assign the account value to the account comprise instructions to:

determine that at least one of the signals is a binary signal that can have only a first value or a second value, wherein the first value signifies a high value account;

determine that the binary signal has a signal value that equals the first value; and assign a known high value as the account value.

4. The system of claim 1, further comprising instructions to, before using the account value to select a security mechanism or storage-related action:

present indicia of the assigned account value to the user;

receive user feedback relating to the assigned account value;

use the feedback to adjust one or more of the weights;

use the adjusted one or more weights to update the set of weighted signal values; and use the updated set of weighted signal values to update the account value.

5. The system of claim 1, wherein:

the signals comprise a first group that comprises any of the following:

the age of the account, the frequency of use of the account by the user, or the amount of data associated with the account; and the instructions to assign the weights to the signal values for each signal in the first group comprise instructions to:

determine whether the signal value of the signal exceeds a threshold, convert the signal value to a binary value based on whether or not it exceeds the threshold, and multiply the binary value for the signal by a weight that corresponds to the signal to yield the weighted signal value for the signal.

6. The system of claim 1, wherein:

the signals comprise a first group that comprises any of the following:

the ability of the account to access a different account, or the ability of the account to access a financial instrument; and the instructions to using the set of weighted signal values to assign an account value to the account comprise instructions to, if at least one of the signals in the first group is present, automatically assigning a known high quantitative value as the account value.

7. The system of claim 1, wherein:

at least one of the signals comprises the measured value of contact information for the user; and the instructions further comprise instructions to determine the measured value of contact information based on at least one of the following:

a number of entities who are contacts that the user has in a contacts database, or a number of entities who are contacts of entities who are also contacts of the user.

8. The system of claim 1, wherein:

at least one of the signals comprises the measured value of reputation for the user; and the instructions further comprise instructions to determine the measured value of reputation based on at least one of the following:

a measurement of external sources that point to published information relating to the account, a measurement of a level of interactions that involve the user's account, where the interactions are those that are between the user and contacts of the user, or a measurement of a level of external communication directed from the account.

9. A system for protecting stored account data from unauthorized access by determining a storage-related action to implement in an account, comprising:

one or more processors, a plurality of data storage facilities that maintain data elements corresponding to an account for a user, wherein the data elements are distributed across two or more data storage facilities and comprise two or more of the following data types: actual user data maintained at a first data storage facility, metadata descriptive of the actual user data maintained at a second data storage facility, user profile data maintained at a third data storage facility, and measured usage parameters maintained at a fourth data storage facility; and one or more non-transitory, computer-readable storage media containing programming instructions that, when executed by the one or more processors cause the processors to:

automatically identify a plurality of signals in the data elements, wherein each of the plurality of signals comprises one or more characteristics of the account, selected from: an age of the account, a frequency of use of the account, contact information associated with the account, a reputation of the account, an amount of data stored or associated with the account, an ability of the account to access other accounts, an ability of the account to access or use financial instruments, or a type of data in the account, for each of the signals, determine a signal value,
assign a plurality of weights to at least a subset of the signal values to yield a set of weighted signal values,
use the set of weighted signal values to assign an account value to the account,
use the account value to select a storage-related action that corresponds to the account value, wherein the storage-related action comprises one or more of the following:
increasing an available storage capacity for the account, or
adding an automatic data backup process to the account, and
cause an account system that comprises the plurality of data storage facilities to automatically implement the selected storage-related action.

10. The system of claim 9, wherein the instructions to assign the plurality of weights to at least a subset of the signal values to yield the set of weighted signal values comprise instructions to:
use the signal values for a first one or more of the signals to determine a weighted signal value for a second one of the signals; and
determine the weighted signal value for the second signal as a product of the determined weight and the signal value of the second signal.

11. The system of claim 9, wherein the instructions to use the set of weighted signal values to assign the account value to the account comprise instructions to:
determine that at least one of the signals is a binary signal that can have only a first value or a second value, wherein the first value signifies a high value account;
determine that the binary signal has a signal value that equals the first value; and
assign a known high value as the account value.

12. The system of claim 9, further comprising instructions to, before using the account value to select a security mechanism or storage-related action:
present indicia of the assigned account value to the user;
receive user feedback relating to the assigned account value;
use the feedback to adjust one or more of the weights;
use the adjusted one or more weights to update the set of weighted signal values; and
use the updated set of weighted signal values to update the account value.

13. The system of claim 9, wherein:
the signals comprise a first group that comprises any of the following:
the age of the account,
the frequency of use of the account by the user, or
the amount of data associated with the account; and
the instructions to assign the weights to the signal values for each signal in the first group comprise instructions to:
determine whether the signal value of the signal exceeds a threshold,
convert the signal value to a binary value based on whether or not it exceeds the threshold, and
multiply the binary value for the signal by a weight that corresponds to the signal to yield the weighted signal value for the signal.

14. The system of claim 9, wherein:
the signals comprise a first group that comprises any of the following:
the ability of the account to access a different account, or
the ability of the account to access a financial instrument; and
the instructions to use the set of weighted signal values to assign an account value to the account comprise instructions to, if at least one of the signals in the first group is present, automatically assign a known high quantitative value as the account value.

15. The system of claim 9, wherein:
at least one of the signals comprises the measured value of contact information for the user; and
the instructions further comprise instructions to determine the measured value of contact information based on at least one of the following:
a number of entities who are contacts that the user has in a contacts database, or
a number of entities who are contacts of entities who are also contacts of the user.

16. The system of claim 9, wherein:
at least one of the signals comprises the measured value of reputation for the user; and
the instructions further comprise instructions to determine the measured value of reputation based on at least one of the following:
a measurement of external sources that point to published information relating to the account,
a measurement of a level of interactions that involve the user's account, where the interactions are those that are between the user and contacts of the user, or
a measurement of a level of external communication directed from the account.

* * * * *